(12) United States Patent
Belanger et al.

(10) Patent No.: US 10,857,981 B2
(45) Date of Patent: *Dec. 8, 2020

(54) VEHICLE RINSING ASSEMBLY FOR EMITTING AIR AND WATER

(71) Applicant: BELANGER, INC., Hamilton, OH (US)

(72) Inventors: Michael J. Belanger, Northville, MI (US); Barry S. Turner, Novi, MI (US); Jerry A. Kotrych, Livonia, MI (US)

(73) Assignee: PISTON OPW, INC., Hamilton, OH (US)

( * ) Notice: Subject to any disclaimer, the term of this patent is extended or adjusted under 35 U.S.C. 154(b) by 698 days.

This patent is subject to a terminal disclaimer.

(21) Appl. No.: 15/589,499

(22) Filed: May 8, 2017

(65) Prior Publication Data

US 2017/0240142 A1 Aug. 24, 2017

Related U.S. Application Data

(63) Continuation-in-part of application No. 14/673,157, filed on Mar. 30, 2015, now Pat. No. 9,802,580.

(Continued)

(51) Int. Cl.
*B60S 3/04* (2006.01)
*B60S 3/00* (2006.01)
*B08B 3/02* (2006.01)

(52) U.S. Cl.
CPC .............. *B60S 3/04* (2013.01); *B08B 3/022* (2013.01); *B60S 3/002* (2013.01)

(58) Field of Classification Search
None
See application file for complete search history.

(56) References Cited

U.S. PATENT DOCUMENTS 4,817,301 A * 4/1989 Belanger ................. B60S 3/002
15/316.1
4,931,244 A * 6/1990 Belanger ................. B60S 3/002
264/154

(Continued)

FOREIGN PATENT DOCUMENTS

EP          0700814 A1      3/1996

OTHER PUBLICATIONS

Office Action regarding related EP App. No. 17 727 021.2; dated Feb. 17, 2020.

*Primary Examiner* — Levon J Shahinian
*Assistant Examiner* — Jason P Riggleman
(74) *Attorney, Agent, or Firm* — Dickinson Wright PLLC

(57) ABSTRACT

A vehicle rinsing assembly includes at least one blower unit having a housing with an air inlet and an air outlet. The air inlet is in communication with a motor unit to draw air into the housing. The rinsing assembly also includes a fluid nozzle disposed on the blower unit and in communication with a fluid source to direct fluid onto the vehicle exterior. The rinsing assembly includes an actuator in communication with the at least one blower unit to direct air emitted from the air outlet in different preselected directions with respect to the vehicle exterior. The rinsing assembly is in communication with a controller such that air from the air outlet and fluid from the fluid nozzle are emitted simultaneously onto the vehicle exterior surface to remove excess water therefrom. The controller is also in communication with the actuator to vary the direction of air flow in response to a location of the vehicle with respect to the at least one blower unit.

38 Claims, 15 Drawing Sheets

Related U.S. Application Data

(60) Provisional application No. 62/333,624, filed on May 9, 2016, provisional application No. 61/972,604, filed on Mar. 31, 2014.

(56) References Cited

U.S. PATENT DOCUMENTS

| | | | | |
|---|---|---|---|---|
| 6,123,503 | A * | 9/2000 | Belanger | B60S 3/002 |
| | | | | 415/127 |
| 9,802,580 | B2 * | 10/2017 | Turner | B60S 3/04 |
| 2007/0028482 | A1 | 2/2007 | Wimmer | |
| 2015/0274134 | A1 | 10/2015 | Turner | |

* cited by examiner

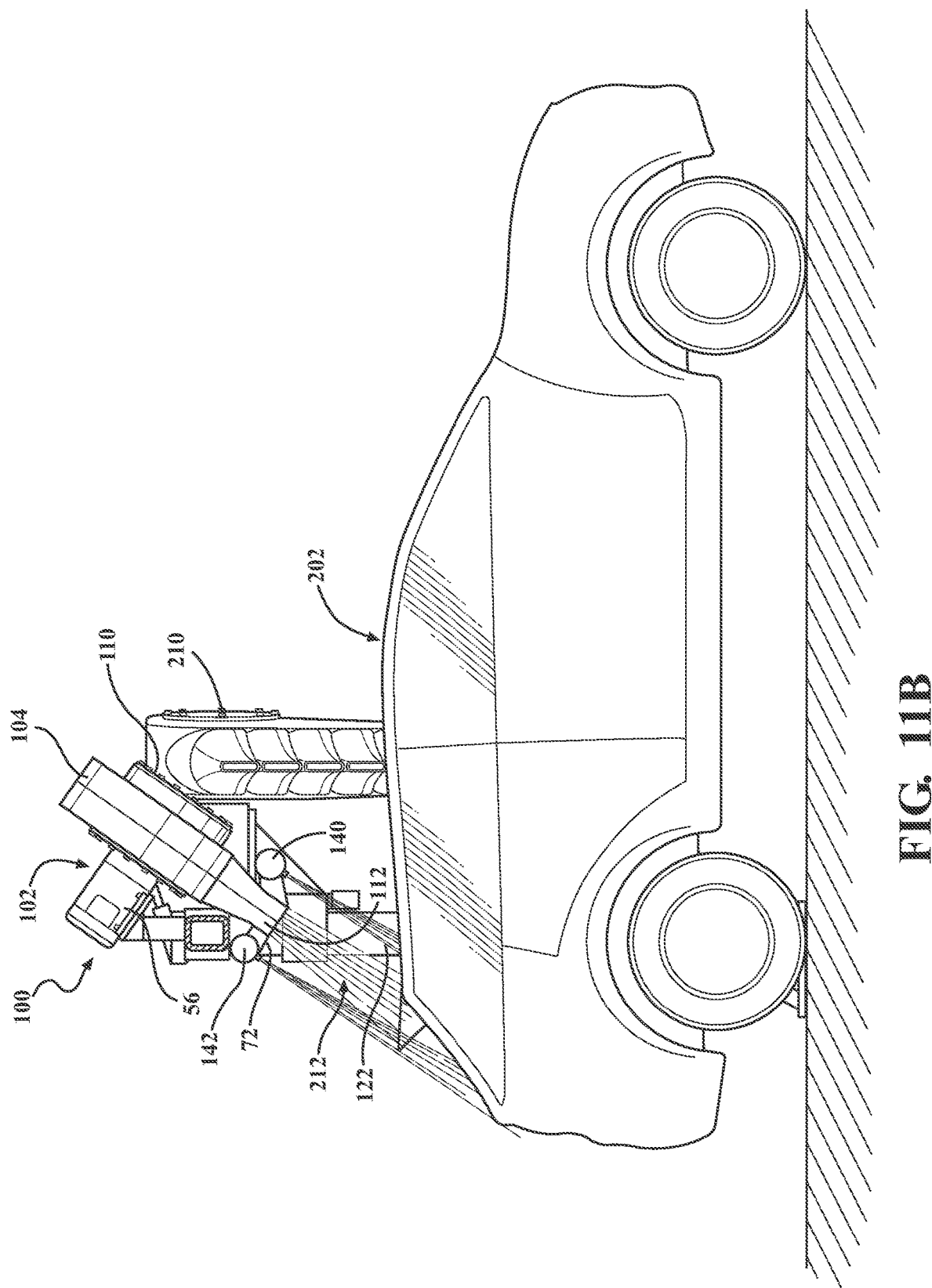

VEHICLE RINSING ASSEMBLY FOR EMITTING AIR AND WATER

CROSS-REFERENCE TO RELATED APPLICATIONS

The present application is a continuation-in-part of U.S. patent application Ser. No. 14/673,157 entitled "A Vehicle Treatment Apparatus that Emits Air and Water", which was filed on Mar. 30, 2015, which claims priority to U.S. Provisional Application Ser. No. 61/972,604, filed Mar. 31, 2014 and entitled "A Vehicle Treatment Apparatus the Emits Air and Water", the disclosures of which are hereby incorporated by reference as though set forth herein. The present application also claims priority to U.S. Provisional Patent Application Ser. No. 62/333,624, entitled "An Improved Vehicle Dryer for A Vehicle Wash and a Method of Using the Same", filed May 9, 2016, the disclosures of which are hereby incorporated by reference as though set forth herein.

TECHNICAL FIELD

The present disclosure relates generally to a vehicle treatment apparatus for use in treating a vehicle exterior as part of a vehicle wash process. More specifically, the present disclosure relates to a vehicle treatment apparatus for use in rinsing a vehicle exterior as part of a vehicle wash process that employs a combination of air and water and which provides increased rinsing capabilities for all vehicle surfaces.

BACKGROUND OF THE DISCLOSURE

Vehicle wash systems are well-known. These systems generally fall into one of the following categories: (1) a self-service wash, where the customer washes their own vehicle and uses equipment provided by the business to perform the wash process, (2) a full service wash, where attendants manually perform or assist in performing the vehicle wash/cleaning process, (3) an automatic wash, where the vehicle travels on a conveyor and engages a number of wash components designed to clean the vehicle exterior, or (4) an in-bay wash where the vehicle is stationary and the wash components move to accomplish the wash process. In the United States, these various businesses on average generate billions of dollars in revenue for servicing over 100,000 vehicles per year, making vehicle washes very lucrative businesses as well as a staple in routine vehicle maintenance.

Typically, vehicle washes and, in particular, automatic washes are furnished with various types of equipment to wash, rinse and dry a vehicle. This equipment commonly includes a conveyor for transporting a vehicle through the equipment, pre-wash equipment for applying pre-soak cleaning solution to the vehicle, friction wash equipment such as various types and sizes of brushes designed to engage and scrub the vehicle as the vehicle travels along the conveyor through the car wash, high pressure equipment to remove or loosen any bugs or dirt from the vehicle, rinse, foam, and wax equipment, and fixed drying equipment such as elephant ear blowers for drying the vehicle at the end of the conveyor. These various components have limitations in treating all surfaces of a vehicle.

For example, a representation of current drying equipment 10 is shown in FIG. 1. As is known, this fixed drying equipment 10 may be found in a vehicle treatment area 12 adjacent an exit end of a wash facility to remove excess water from a vehicle exterior. As is known, conventional drying equipment can include a plurality of elephant ear blowers or dryer units 14 mounted to a frame 16 at a fixed angle X in order to direct air at a high velocity onto the vehicle exterior. The frame 16 may include a pair of upstanding legs 18 and an overhead portion 20. The dryer units 14 may be secured to each of the upstanding legs 18 as well as the overhead portion 20 and are positioned to direct air towards a vehicle 22 in a vehicle treatment area. In this configuration, the dryer units 14 are fixedly secured such that they remain fully stationary while drying the vehicle 22. In other words, the dryer units 14 are in a single locked position and do not adjust as the vehicle 22 travels towards, underneath, and away from the frame 16.

Other problems and limits are known to exist with current drying equipment in vehicle wash systems. Specifically, existing drying equipment is generally the most inefficient of all vehicle wash equipment as current drying equipment cannot fully remove all water from a vehicle exterior, in part, since it is unable to adequately dry all surfaces of the vehicle. This is exemplarily shown in FIGS. 2A and 2B, which are side and top views of exemplary current dryer equipment, where the individual dryer units 14 are oriented at a generally perpendicular angle A relative to exterior of the vehicle 22 in the vehicle treatment area 12. Similarly, FIGS. 3A and 3B are side and top views of other exemplary current dryer equipment, where the individual dryer units 14 are oriented at a rearward facing angle B relative to the vehicle 22 in the vehicle treatment area 12. In either example, portions 24 of the vehicle 22, such as the rear vehicle surfaces, may not be sufficiently dry after exiting the car wash leaving water marks or streaks on the vehicle. As such, many current vehicle wash systems utilize an attendant at the exit end of the wash to further dry the vehicle which negatively affects the efficiency of the car wash and increases the cost for operating the same.

Additionally, as is also known, due to the inability of existing dryer systems to remove a sufficient amount of water from a vehicle exterior, there are constant efforts aimed at improving dryer performance. Thus, there is a need for an improved vehicle dryer for a vehicle wash or for other equipment to assist with dryer performance.

SUMMARY OF THE DISCLOSURE

It is therefore an aspect of the present disclosure to provide an improved vehicle rinsing assembly for a vehicle wash system and an improved method for rinsing a vehicle traveling through a vehicle wash, which utilizes an improved vehicle rinse assembly.

It is another aspect of the present disclosure to provide an improved vehicle rinse assembly for a vehicle wash system that more fully removes excess water from a vehicle exterior.

It is a related aspect of the present disclosure to provide an improved vehicle rinse assembly that is configured to more effectively direct air and water onto all exterior vehicle surfaces in order to provide improved rinse performance.

It is still another aspect of the present disclosure to provide a vehicle rinse assembly that decreases the cost of operation of associated vehicle dryers.

It is yet another aspect of the present disclosure to provide a vehicle rinse assembly that allows for a decrease in the length of the drip space zone required as part of the vehicle wash.

It is still yet a further aspect of the present disclosure to provide a vehicle rinse assembly that allows for incorporation of additional vehicle wash components into a vehicle wash system to increase the quality of the vehicle wash process without requiring additional conveyor length.

It is yet a further aspect of the present disclosure to provide a vehicle rinse assembly that decreases the amount of water required as part of the vehicle wash process.

It is yet another aspect of the present disclosure to provide a vehicle rinse assembly that allows for faster operation of a vehicle wash system to clean more vehicles in a shorter period of time, without compromising the quality of the washing/drying functions.

In accordance with the above and the other aspect of the present disclosure, a vehicle rinse assembly system is provided for treating an exterior of a vehicle. The rinse assembly includes at least one blower unit having a housing with an air inlet and an air outlet. The air inlet is in communication with a motor unit to draw air into the housing. The rinse assembly also includes a fluid nozzle disposed on the blower unit and in communication with a fluid source to direct fluid onto the vehicle exterior. The rinse assembly includes an actuator in communication with the at least one blower unit to direct air emitted from the air outlet in different preselected directions with respect to the vehicle exterior. The rinse assembly is in communication with a controller such that air from the air outlet and fluid from the fluid nozzle are emitted simultaneously onto the vehicle exterior surface to remove excess water therefrom. The controller is also in communication with the actuator to vary the direction of air flow in response to a location of the vehicle with respect to the at least one blower unit.

BRIEF DESCRIPTION OF THE DRAWINGS

Other aspects of the present disclosure will be readily appreciated, as the same becomes better understood by reference to the following detailed description when considered in connection with the accompanying drawings where:

FIG. 11B is a side view of the exemplary vehicle rinse assembly of FIG. 11A partially broken away treating a middle portion of a vehicle in accordance with an aspect of the present disclosure;

DETAILED DESCRIPTION OF THE DISCLOSURE

Detailed aspects of the present disclosure are disclosed herein; however, it is to be understood that the disclosed aspects are merely exemplary and may be embodied in various and alternative forms. It is not intended that these examples illustrate and describe all possible forms of the disclosure. Rather, the words used in the specification are words of description rather than limitation, and it is to be understood that various changes may be made without departing from the spirit and scope of the disclosure. As those of ordinary skill in the art will understand, various features of the present disclosure are illustrated and described with reference to the Figures and may be combined with features illustrated in one or more other Figures to produce aspects of the present disclosure that are not explicitly illustrated or described in any individual drawing. The combinations of features illustrated provide representative examples for typical applications. However, various combinations and modifications of the features consistent with the teachings of the present disclosure may be desired for particular applications or implementations.

Figure 1:
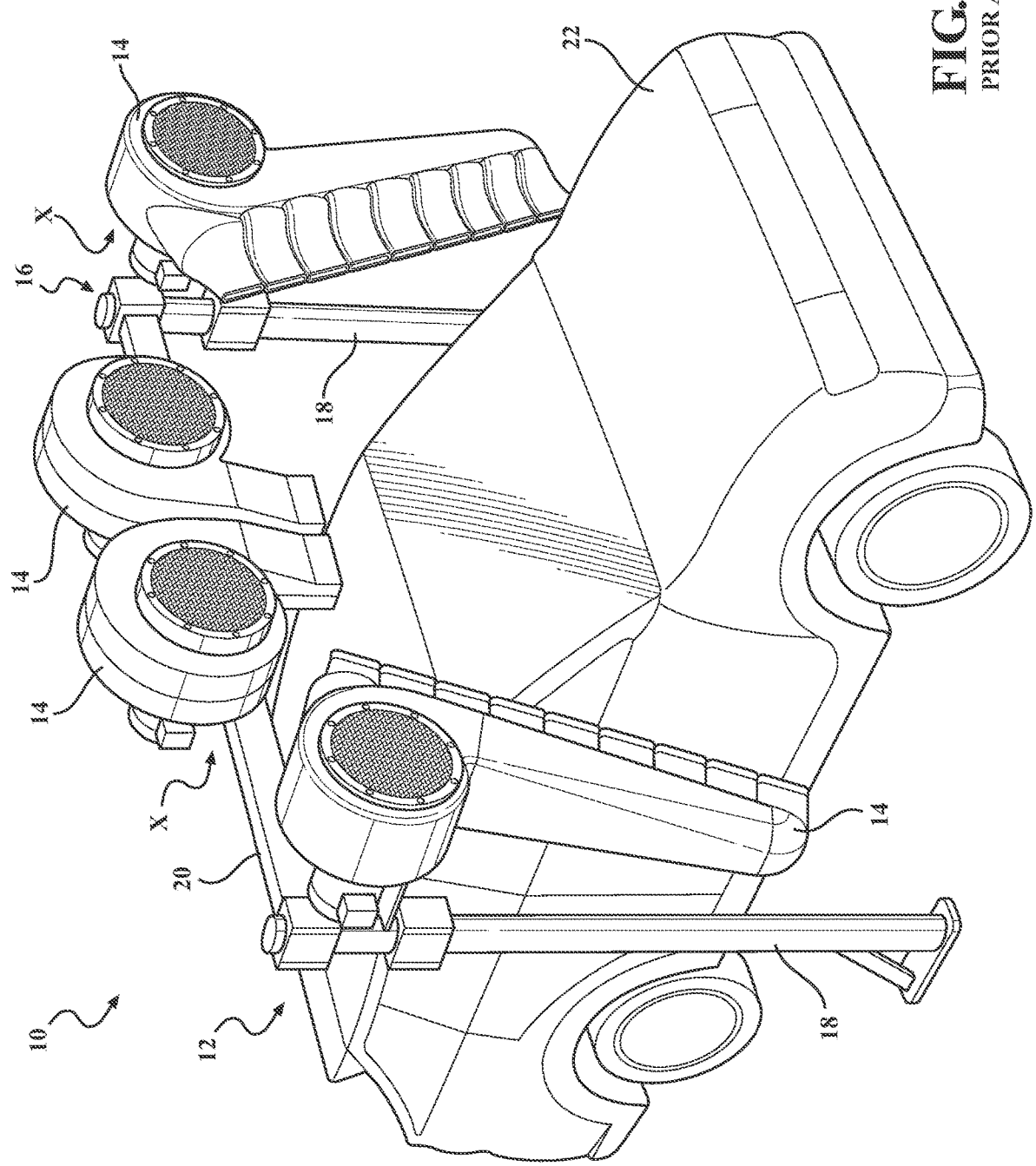
FIG. 1 is a schematic illustration of a prior art vehicle treatment component having a plurality of dryer assemblies.
Figure 2A:
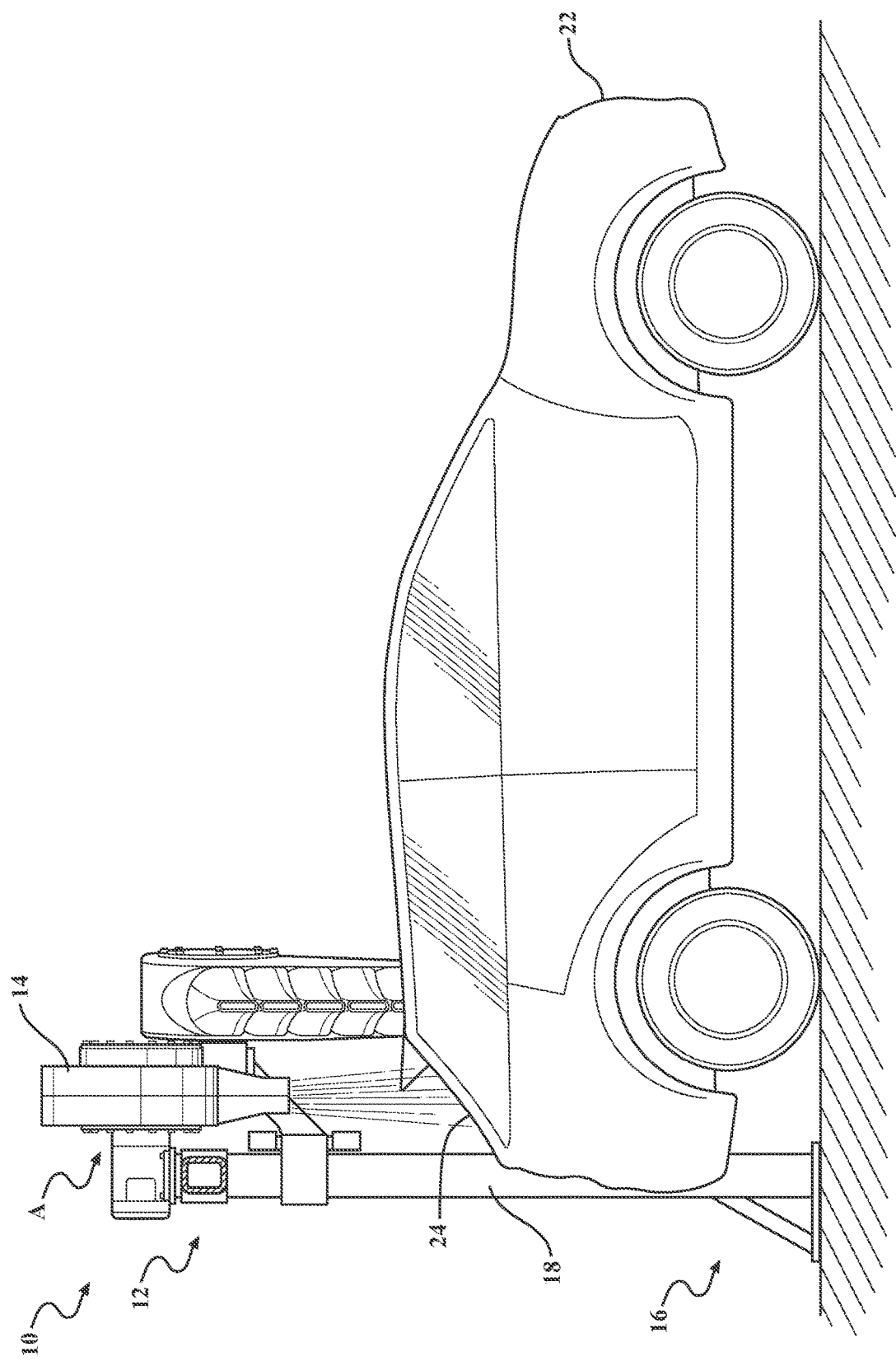
FIG. 2A is a side view of a prior art vehicle treatment component having a plurality of dryer assemblies in operation and oriented at a fixed angle relative to a vehicle in a vehicle treatment area.
Figure 2B:
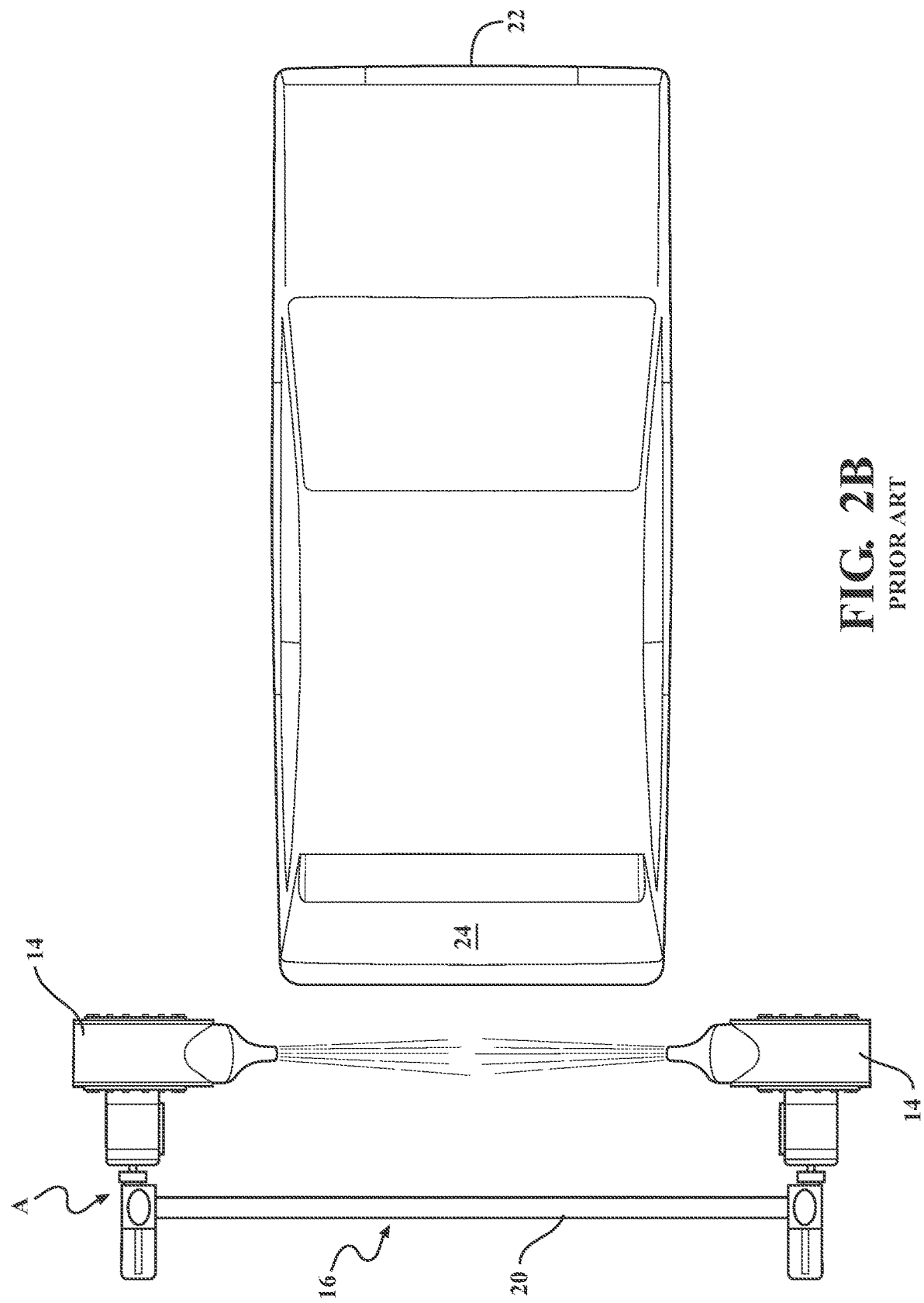
FIG. 2B is a top view of the prior art vehicle treatment component of FIG. 2A.
Figure 3A:
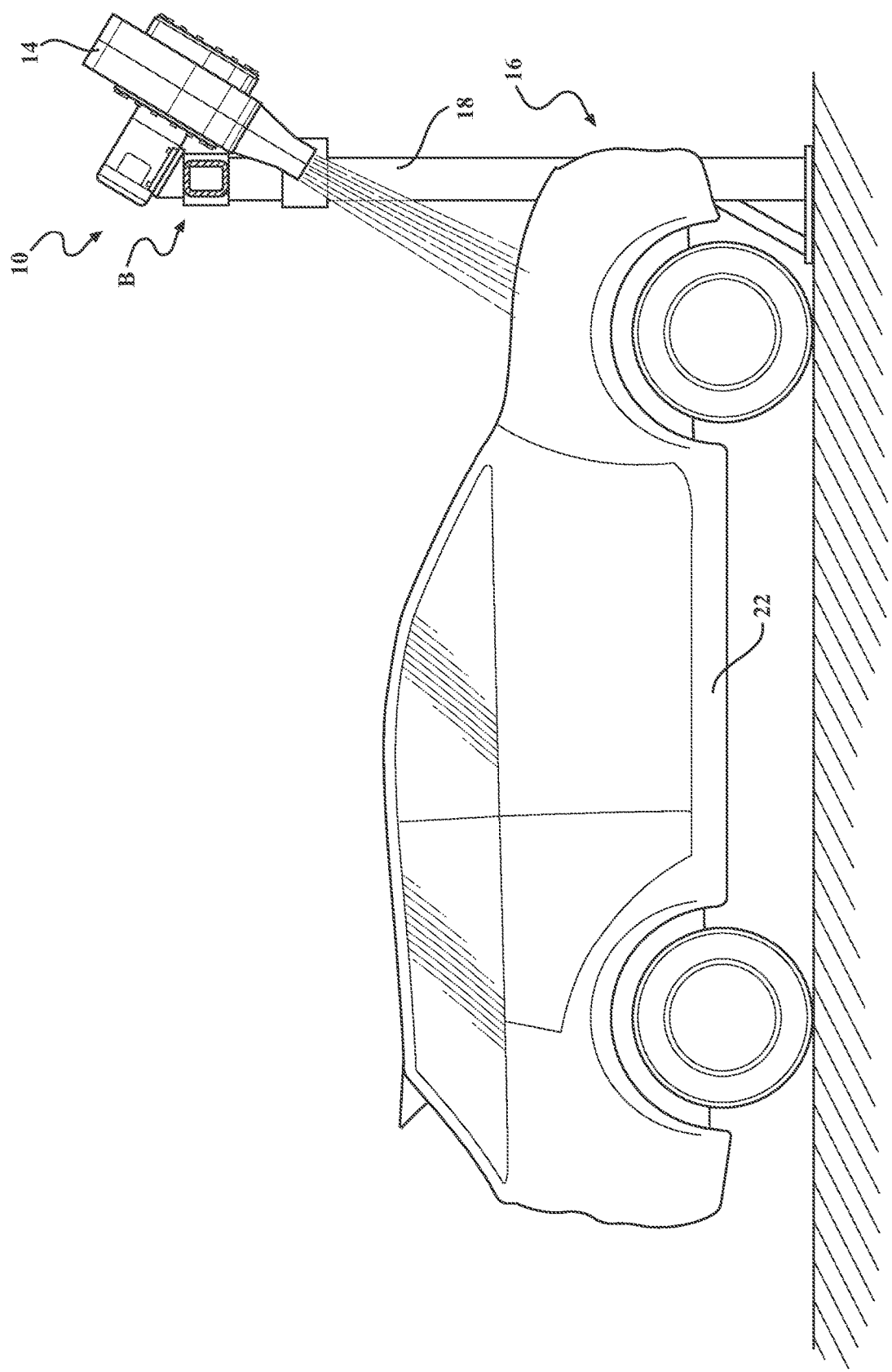
FIG. 3A is a side view of a prior art vehicle treatment component with a dryer assembly oriented at a fixed rearward facing angle with respect to a vehicle in one position in a vehicle treatment area.
Figure 3B:
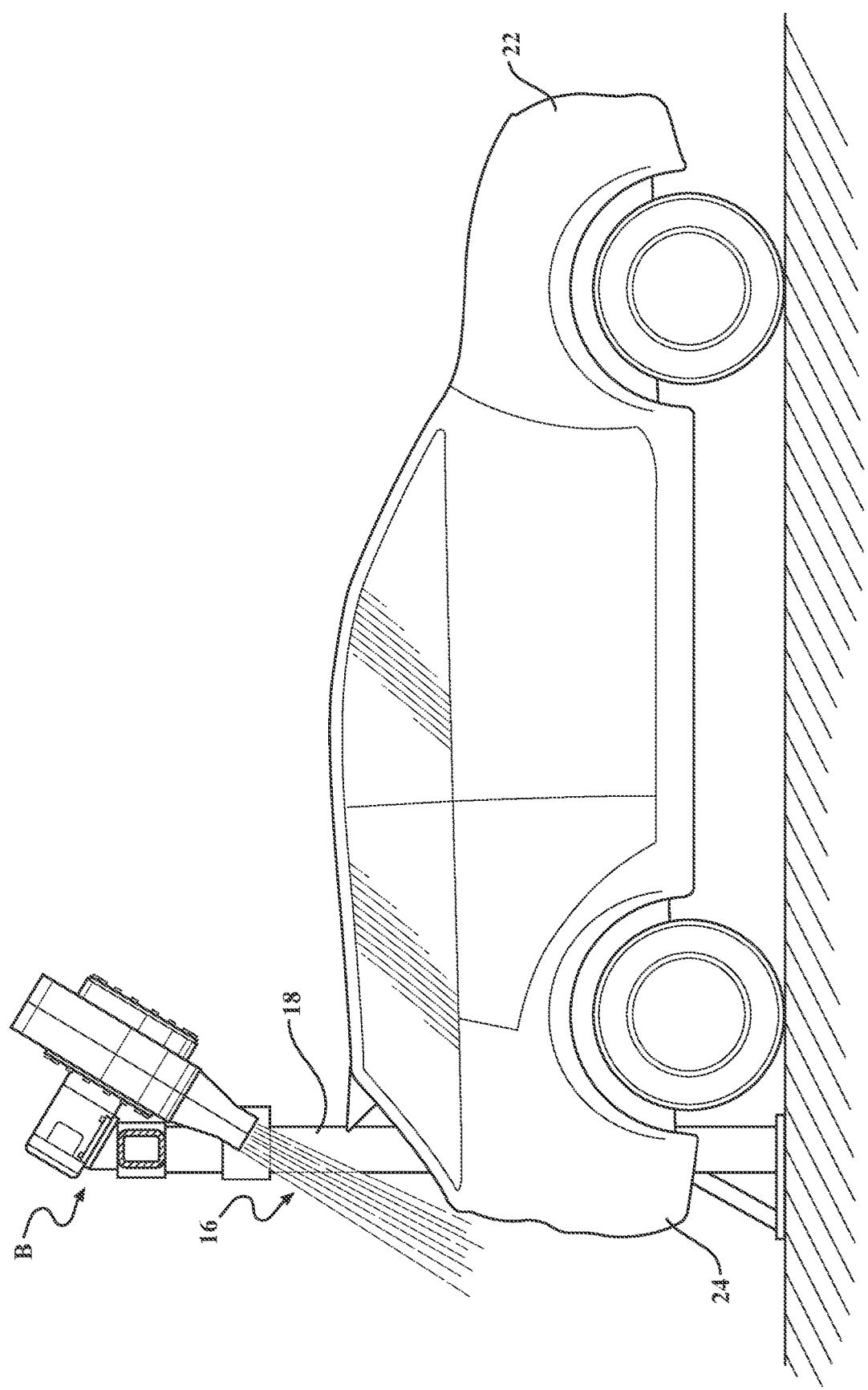
FIG. 3B is a side view of the prior art vehicle treatment component of FIG. 3A with a vehicle in another position in a vehicle treatment area.
Figure 4:
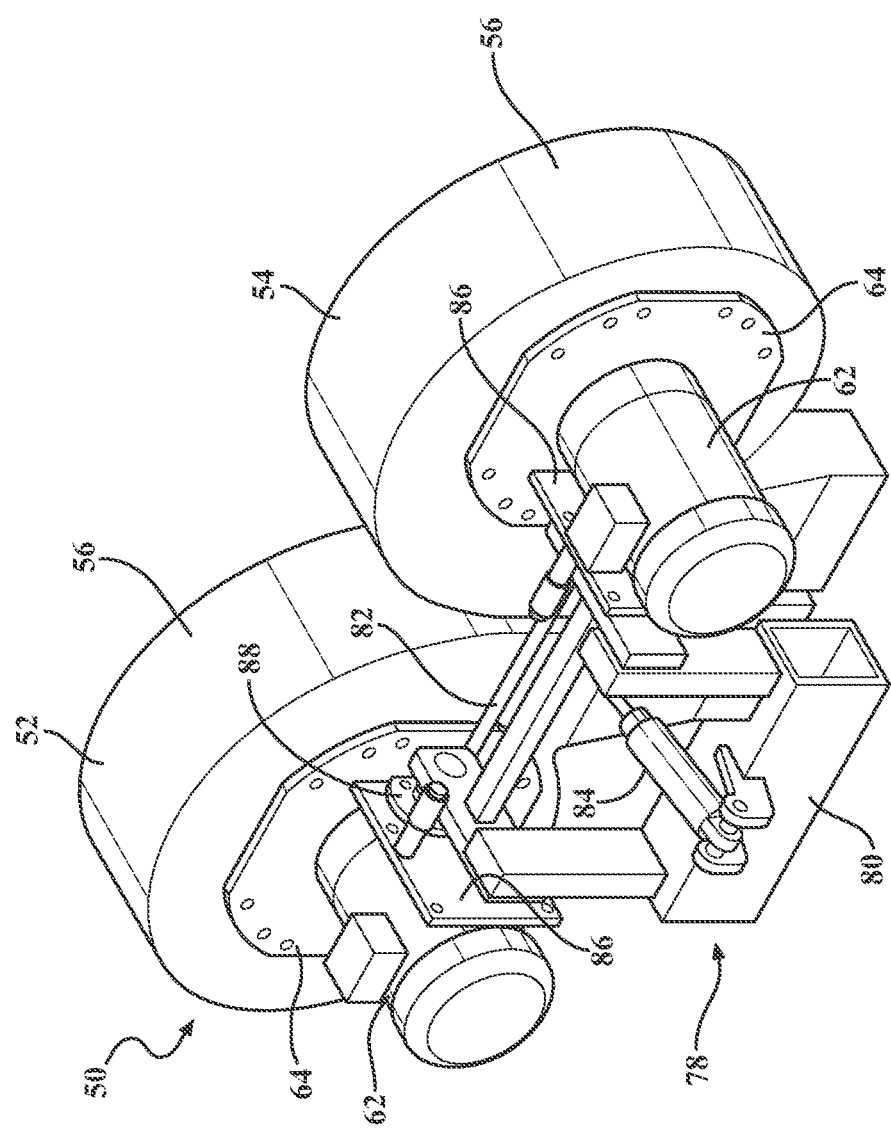
FIG. 4 is a perspective view of an exemplary vehicle rinse assembly for a vehicle wash system in accordance with an aspect of the present disclosure.
Figure 5:
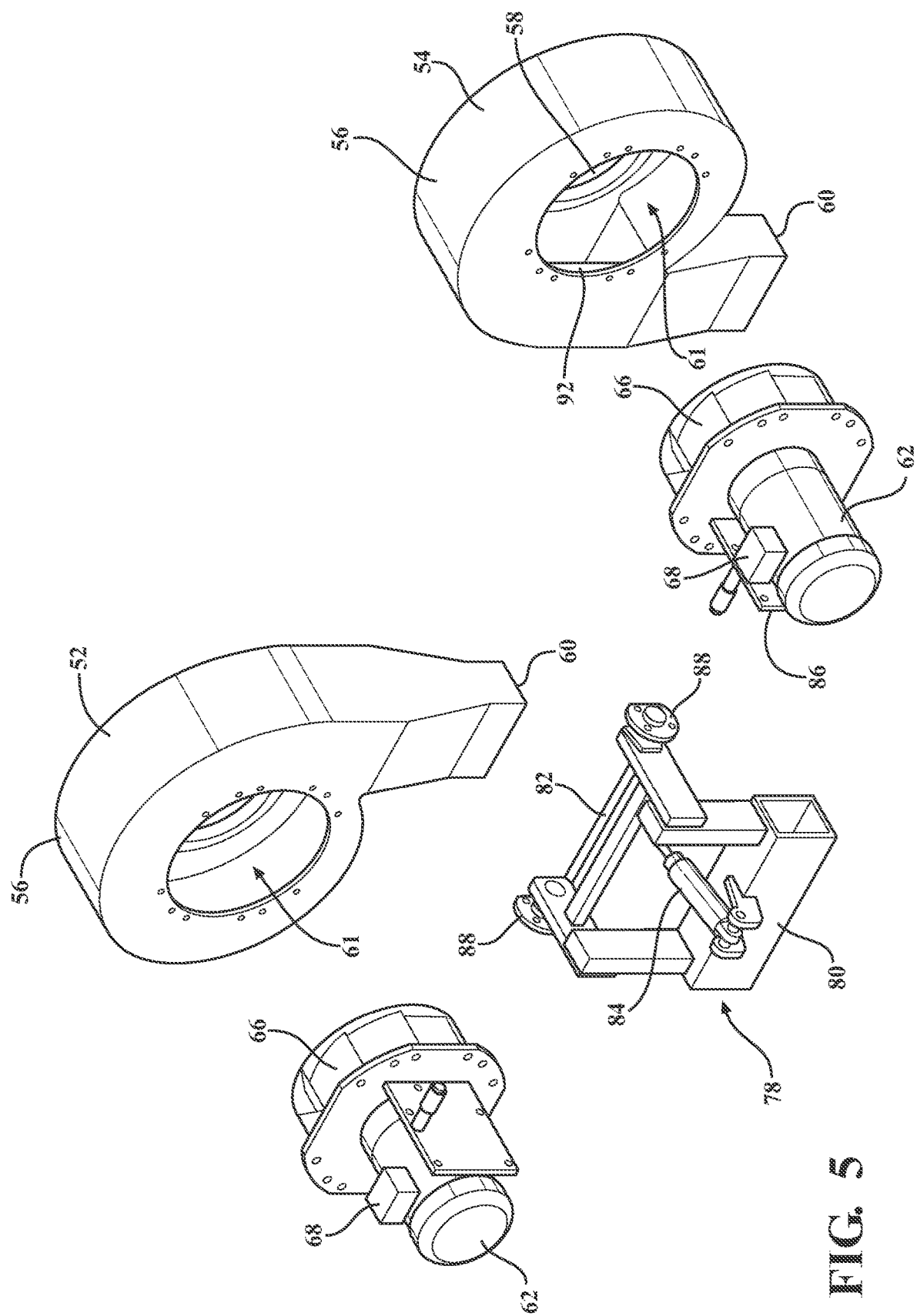
FIG. 5 is an exploded view of an exemplary vehicle rinse assembly for a vehicle wash system in accordance with an aspect of the present disclosure.
Figure 6:
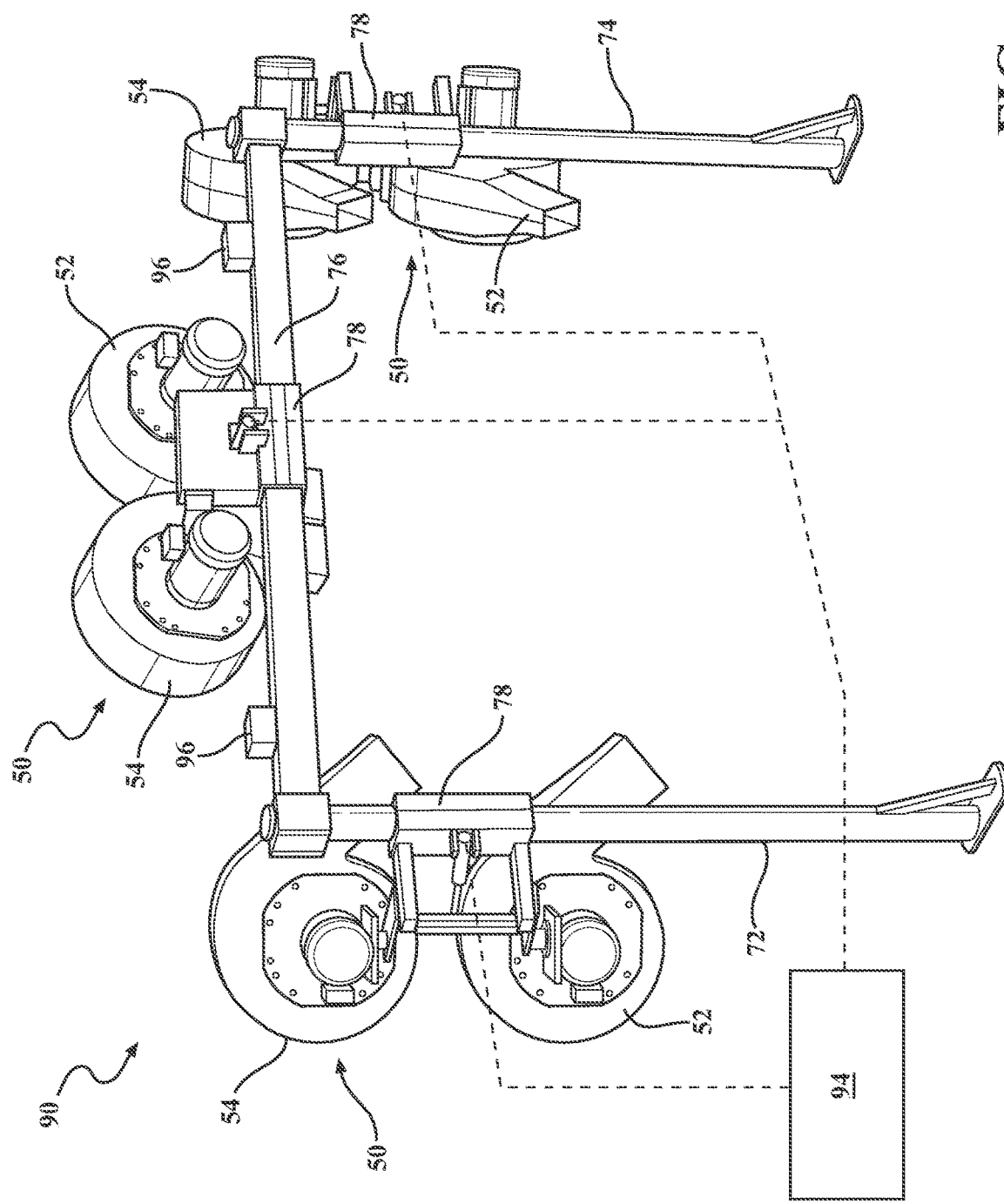
FIG. 6 is a perspective view of a vehicle treatment component including a plurality of vehicle rinse assemblies in accordance with an aspect of the present disclosure.
Figure 7:
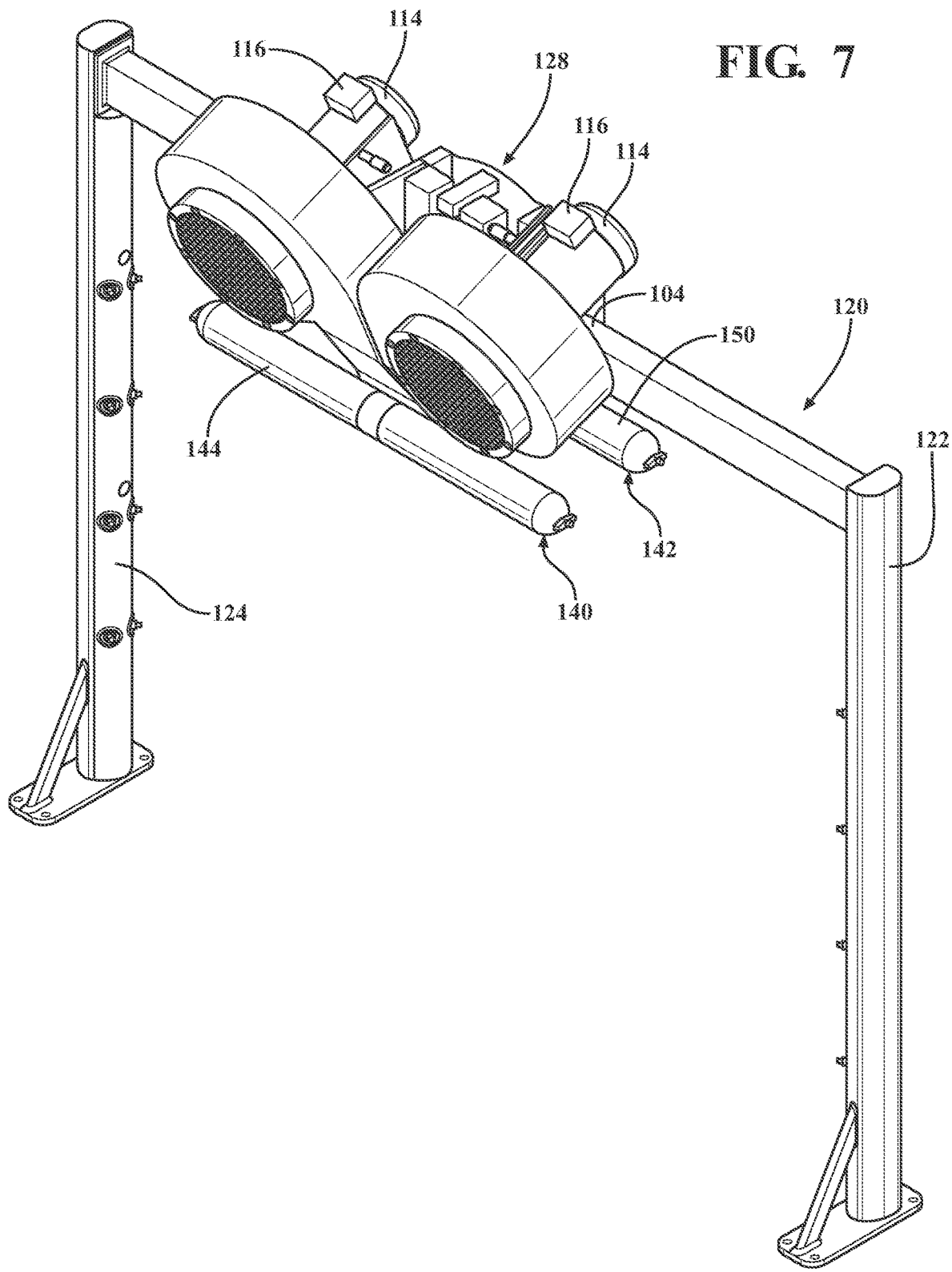
FIG. 7 is a perspective view of a vehicle treatment component having a rinse assembly in accordance with another aspect of the present disclosure.
Figure 8:
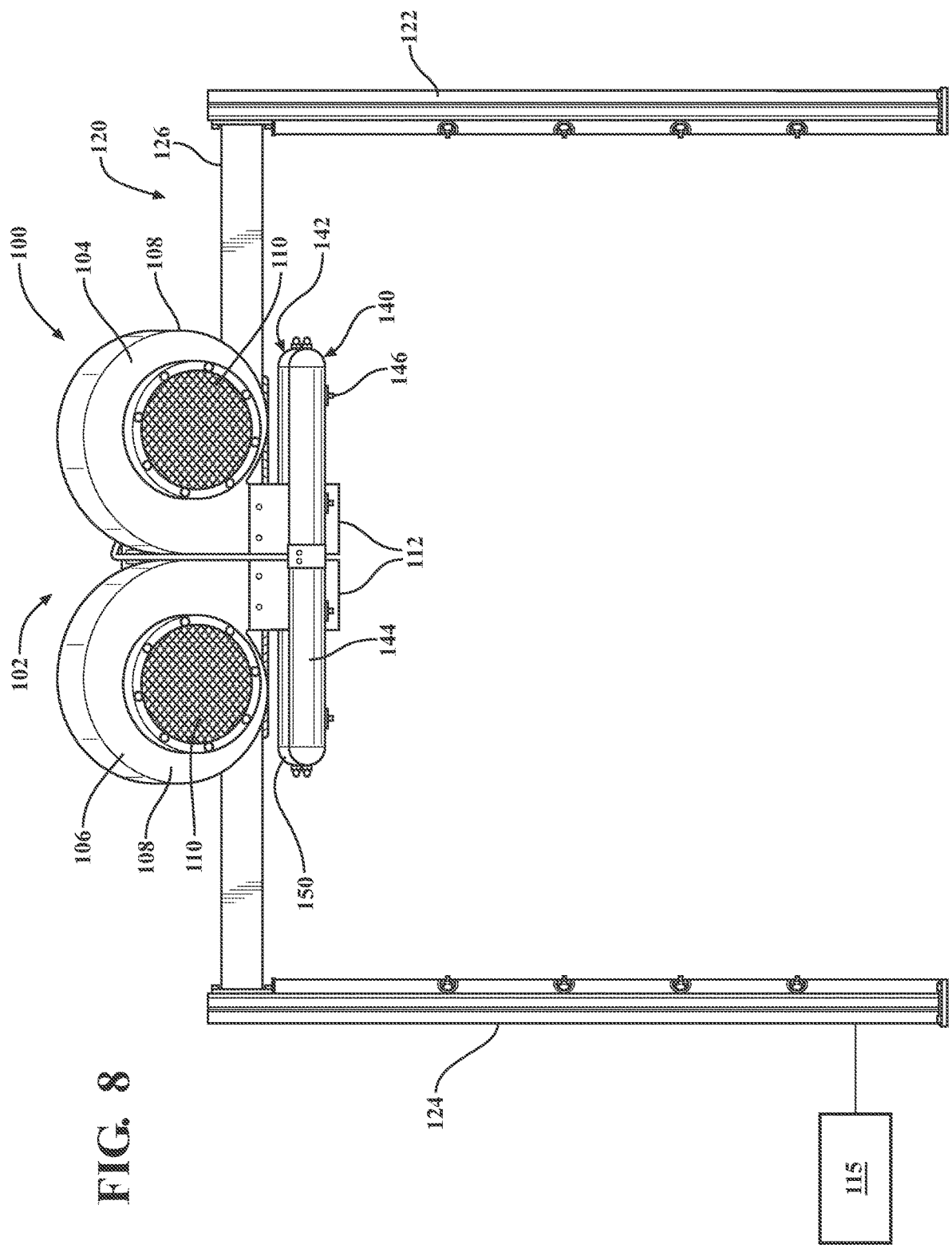
FIG. 8 is a front view of a vehicle treatment component having a rinse assembly in accordance with another aspect of the present disclosure.
Figure 9:
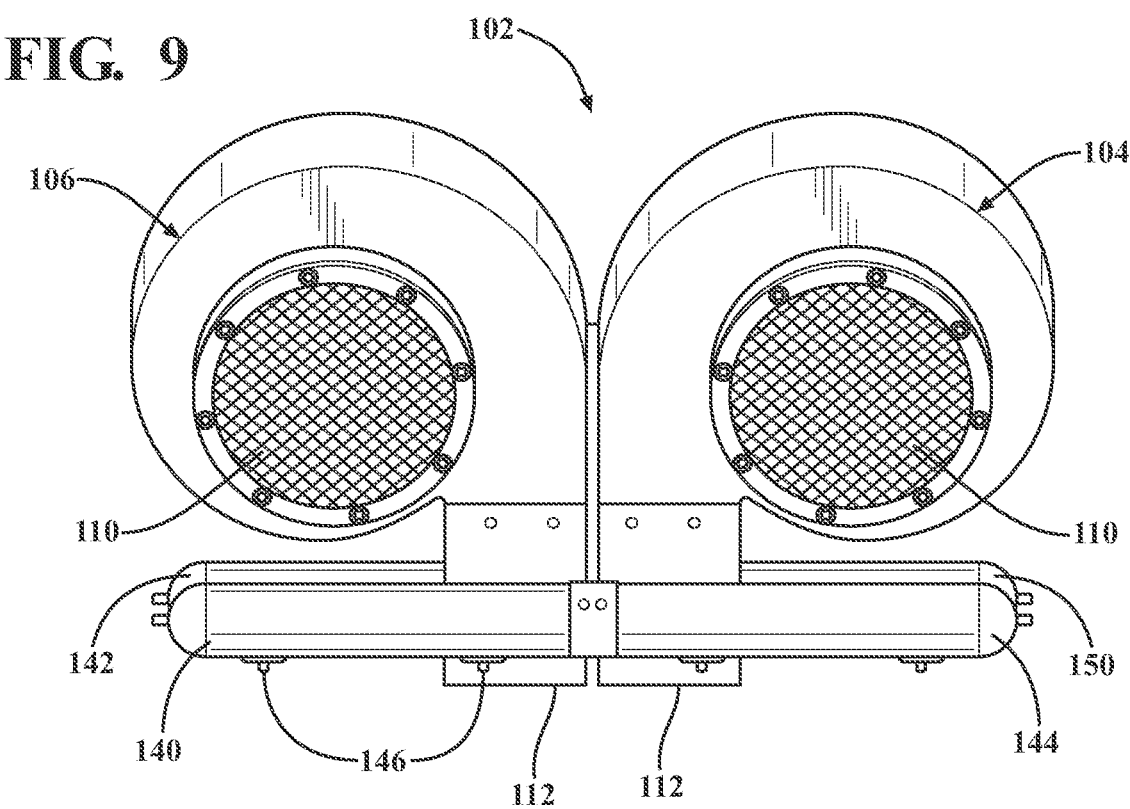
FIG. 9 is front view of vehicle rinse assembly in accordance with another aspect of the present disclosure.
Figure 10:
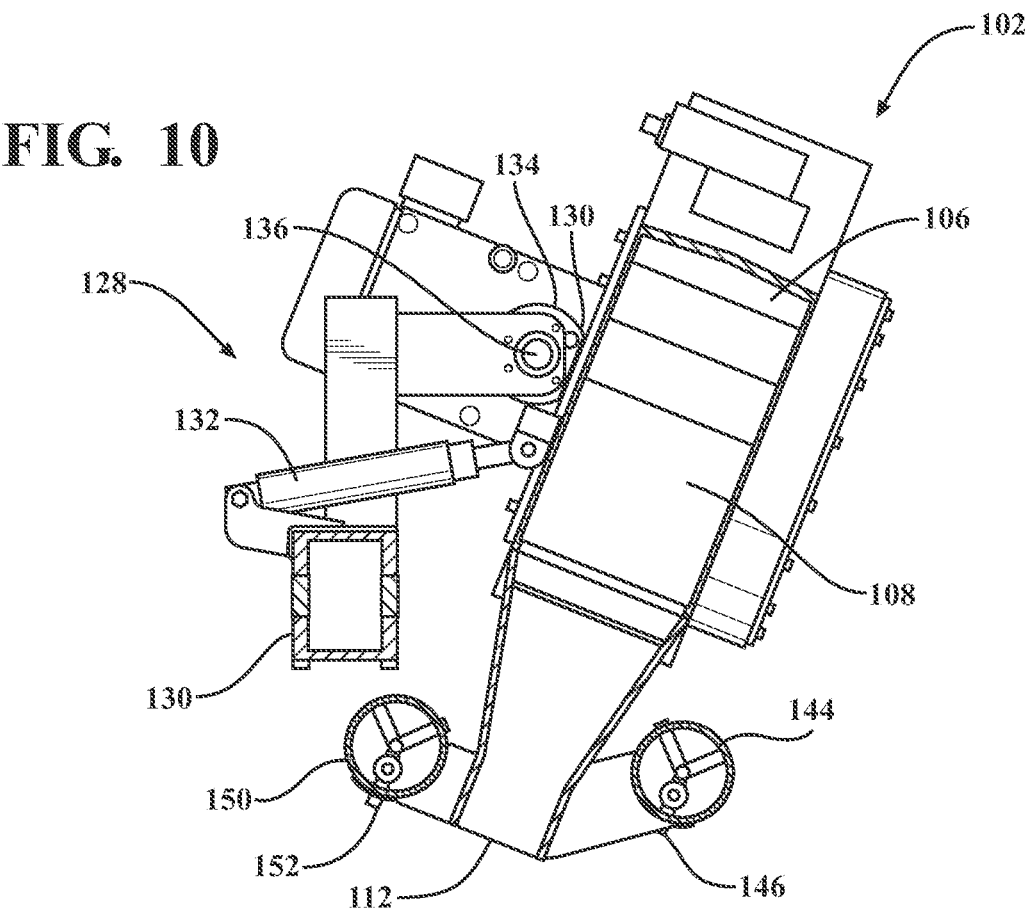
FIG. 10 is a cross-sectional view of the vehicle rinse assembly of FIG. 9 in the direction of the arrows 10-10.

With reference to FIGS. 4 through 6, a vehicle dryer assembly 50 for a vehicle wash system in accordance with an aspect of the present disclosure is shown. According to an aspect, the vehicle dryer assembly 50 may include a pair of dryer units 52, 54. According to an aspect, as shown, each of the dryer units 52, 54 may be substantially identical in construction and operation except for being mirror images of one another. As such, the description of one dryer unit applies equally to the other. Each of the dryer units 52, 54 may include a housing 56 with an air inlet 58 and an air outlet 60. Each of the dryer units 52, 54 may include a motor unit 62, which may be secured to a backside of the housing 56 by a plate 64 to generally seal that side of the housing. The motor unit 62 may be in communication with an impeller 66 to effect rotation thereof in order to draw air into housing 56 through the air inlet 58. The air inlet 58 may have a screen disposed there over to block entry of objects into the housing. The motor unit 62 may be in electrical communication with a system controller via an electrical connector box 68. The motor unit 62 may be electrically driven. However, a variety of other suitable types of motors or drive devices may be employed. According to another aspect, the housing 56 may be formed of a plastic material. However, it will be appreciated that a variety of other suitable materials may be employed. Additionally, the housing may be formed of a translucent material and may further include one or more lights 92 for illuminating the housing as is disclosed in Applicant's co-pending U.S. patent application Ser. No. 15/067,587, entitled "Vehicle Wash Dryer Assembly", filed on Mar. 11, 2016, which is hereby incorporated by reference as though set forth fully herein.

As shown, the air inlet 58 may be substantially open at all times. According to a further aspect, the air inlet 58 may include a variable flow mechanism to regulate the rate of air flow into the housing through the air inlet 58 and thus the air outlet 60. An exemplary variable flow mechanism that may be employed with the vehicle dryer assembly 50 is disclosed in U.S. patent application Ser. No. 15/589,401, entitled "A Mechanism for Selectively Opening/Closing a Vehicle Wash Component Inlet Opening", which is filed concurrently herewith, the disclosure of which is hereby incorporated by reference as though set forth fully herein.

According to another aspect, each of the dryer units 52, 54 may be secured to a frame 70 having a pair of upstanding legs 72, 74 and an overhead boom 76 (FIG. 6). It will be appreciated that the frame 70 may be disposed adjacent and over the vehicle treatment area. It will be appreciated that separate dryer assemblies 50 may be disposed on each of the upstanding legs 72, 74 as well as the overhead boom 76. Each of the dryer assemblies may have the identical configuration. As such, the description of one applies equally to all. It will also be appreciated that the dryer assemblies 50 mounted to different portions of the frame 70 can have different configurations as desired. According to an aspect, the dryer units 52, 54 may be secured to the frame 70 by a mount bracket 78. The mount bracket 78 may include clamp portion 80 that is configured to engage and secure the mount bracket 78 to the overhead boom 76 or the legs 72, 74. According to a further aspect, the mount bracket 78 can include a drive bar 82 which may be in communication with a cylinder 84 to effectuate movement of the drive bar 82 and thus pivoting of the dryer assembly 50. According to an aspect, the cylinder 84 may be a pneumatic cylinder. However, a variety of other types of cylinders may be employed, such as a hydraulic cylinder. Alternatively, other suitable drive mechanism or actuators may be employed to effect movement of the drive bar 82. According to an aspect, the cylinder 84 may be in electrical communication with a system controller 94 in order to actuate the cylinder 84 between an extended position and a retracted position.

According to an aspect, each dryer unit 52, 54 may be pivotally secured to the mount bracket 78. Specifically, as shown, each motor unit 62 may have an attachment plate 86 secured thereto, which is in turn mounted to a bearing 88 disposed adjacent either end of the drive bar 82. According to an aspect, pivoting of the drive bar 82 can cause the dryer assembly 50 to move in order to change the direction in which air is emitted from the air outlet 60. According to an aspect, the cylinder 84 may normally be in an extended position such that the dryer assembly 50 is positioned so that air flow through the air outlet 60 is directed rearward, i.e. against the direction of travel of the vehicle. According to a further aspect, the cylinder 84 may be actuated to a retracted position to cause the dryer assembly 50 to move to a position where air flow through the air outlet 60 is directed forwardly, i.e. with the direction of travel of the vehicle. Alternatively, in the retracted position, the dryer assembly 50 may be moved to a position where air flow through the air outlet 60 is directed generally perpendicularly downward. It will be appreciated that the dryer assembly may be pivoted or rotated in a variety of other suitable ways.

According to an aspect, the improved dryer assembly 50 may also be in communication with a sensor assembly via the controller 94. According to another aspect, the controller 94 may be communicatively connected to the sensor assembly via a wired or wireless connection. As discussed above, the controller 94 may also be connected to cylinder 84 to effect movement thereof between the extended and retracted positions. According to an aspect, the controller may be pre-programmed with control logic for activating and controlling movement of the actuator and thus the direction of air flow from the dryer assembly 50. With respect to the sensor assembly, it may include one or more sensors for detecting a location of a vehicle as it travels towards, underneath, and away from the frame. According to an aspect, this information may be communicated to the controller 94 which may actuate the cylinder 84 depending upon the location of the vehicle, as discussed in more detail herein. The one or more sensors may be disposed on the frame, on each dryer unit or at other locations within the vehicle wash facility. It will be appreciated that a variety of other suitable detection mechanisms for determining the location of a vehicle in the vehicle wash may be employed.

FIG. 6 is a perspective view of a vehicle treatment component 90 disposed adjacent a vehicle treatment area in accordance with an aspect of the present disclosure. As shown, the vehicle treatment component 90 can include a plurality of vehicle dryer assemblies 50 individually mounted to the frame 70 via mount brackets 78, which may be angled in the same or different directions depending on location of the vehicle. According to an aspect, one dryer assembly 50 may be mounted to the overhead boom 76 and one may be mounted to each of the legs 72, 74. A single sensor assembly and controller 94 may be used to detect the vehicle and adjust the plurality of vehicle dryers assemblies 50 based on the location of the vehicle relative to the frame 70, as discussed herein. Alternatively, there may be a sensor assembly and controller associated with each of the vehicle dryer assemblies 50 individually such that their positions may be separately controlled.

FIGS. 7 through 10 illustrate a vehicle wash component 100, including a rinse assembly 102 according to another aspect of the present disclosure. According to this aspect, the vehicle rinse assembly 102 may include a pair of blower units 104, 106, which may be substantially identical in construction and operation except, as shown, they may be mirror images of one another. Each of the blower units 104, 106 may include a housing 108 with an air inlet 110 and an air outlet 112. Each of the blower units 104, 106 may include a motor unit 114, which may be secured to a backside of the housing 108 by a plate or the like. The motor unit 114 may include an impeller to effect rotation thereof in order to draw air into the housing 108 through the air inlet 110. The motor unit 114 may be electrically driven and may be in communication with a system controller 115 via electrical connector box 116. It will be appreciated that a variety of other suitable motors or drive devices may be employed. It will also be appreciated that the housing can be formed of a variety of suitable materials. As shown, the air inlet 110 may be substantially open at all times. According to a further aspect, the air inlet 110 may include a variable flow mechanism to regulate the rate of air flow into the housing 108 through the air inlet 58, as is discussed above.

According to another aspect, each of the blower units 104, 106 may be secured to a frame 120 having a pair of upstanding legs 122, 124 and an overhead boom 126. It will be appreciated that the frame 120 may be disposed adjacent and over the vehicle treatment area. It will be appreciated that separate rinse assemblies 102 may be disposed on each of the upstanding legs 122, 124. According to an aspect, the rinse assembly 102 may be secured to the frame 120 by a mount bracket 128. The mount bracket 128 may include a clamp portion 130 that is configured to engage and secure the mount bracket 128 to the overhead boom 126. According to a further aspect, the mount bracket 128 can include a drive bar 130 which may be in communication with a cylinder 132 to effectuate movement of the drive bar 130. According to an aspect, the cylinder 132 may be a pneumatic cylinder. However, a variety of other types of cylinders may be employed, such as a hydraulic cylinder. Alternatively, other suitable drive mechanism or actuators may be employed to effect movement of the drive bar 130. The cylinder 132 may be in electrical communication with the system controller 115 in order to actuate the cylinder 132 between an extended position and a retracted position. It will be appreciated that the cylinder 132 can by actuated to various intermediate positions as desired to provide additional air flow directions.

According to an aspect, each blower unit 104, 106 may be pivotally secured to the mount bracket 128. Specifically, as shown, each blower unit 104, 106 may be mounted via the motor unit 114 to a bearing 134 at a pivot point 136. According to an aspect, moving the drive bar 130 can cause the rinse assembly 102 to pivot about pivot point 136 in order to change the direction in which air is emitted from the air outlet 112 with respect to an exterior of a vehicle surface. According to an aspect, the cylinder 132 is normally in the extended position such that the rinse assembly 102 is positioned to emit air flow through the air outlets 112 rearward, i.e. against the direction of travel of the vehicle. According to another aspect, the cylinder 132 may be actuated such that it moves to a retracted position causing the rinse assembly 102 to move to a position where air flow through the air outlets 112 may be directed forwardly, i.e. with the direction of travel of the vehicle. Alternatively, when the cylinder 132 is in the retracted position, the rinse assembly 102 may be rotated to a position where air flow through the air outlets 112 may be directed generally perpendicularly downward with respect to an exterior of a vehicle surface. It will be appreciated that the rinse assembly may be pivoted or rotated in a variety of other suitable ways. It will also be appreciated that the cylinder 132 may also be normally position in a retracted position such that the rinse assembly 102 is positioned to emit air flow through the air outlets 112 rearward.

According to another aspect, the rinse assembly 102 may further include a first fluid portion 140, and a second fluid portion 142. According to an aspect, the first fluid portion 140 may be disposed on the upstream side of the air outlets 112 as defined by the direction of travel of the vehicle. The first fluid portion 140 may include a first manifold portion 144 that is in communication with a plurality of nozzle portions 146. According to an aspect, the first manifold portion 144 may be in communication with a fluid supply, such as a supply of water. However, the first manifold portion 144 may be in communication with a variety of other fluids. The first fluid portion 140 may be configured to emit fluid through the plurality of fluid nozzles 146 onto an exterior surface of a vehicle, such as a top surface. According to an aspect, the plurality of nozzle portions 146 may be configured such that fluid can be directed onto the vehicle exterior at an angle. According to another aspect, the plurality of nozzle portions 146 may be configured to direct air at a rearward angle, i.e., in a direction toward a rear of a vehicle. It will also be appreciated that the direction and magnitude of the angle may also vary. For example, the plurality of nozzle portions 146 may be configured to emit fluid toward the front of the vehicle, i.e. with the direction of vehicle travel. Alternatively, the plurality of nozzle portions 146 can direct fluid in a direction generally parallel to the air flow though outlets 112. According to an aspect, as discussed herein, the flow of fluid from the plurality of nozzle portions 146 can match the flow of air from the air outlets 112 of the rinse assembly 102.

According to a further aspect, the second fluid portion 142 may be disposed downstream of the first fluid portion 140 as defined by the direction of travel of the vehicle. The second fluid portion 142 can include a second manifold portion 150 that is in communication with a plurality of nozzle portions 152. According to an aspect, the second manifold portion 150 may also be in communication with a supply of fluid. According to another aspect, the fluid supply for the second fluid portion 142 may be a drying agent. However, the second fluid portion 142 may be in communication with a variety of other suitable fluids. The second fluid portion 142 may be configured to emit fluid through the plurality of nozzle portions 152 onto an exterior side surface of a vehicle, such as a top surface. According to an aspect, the plurality of nozzle portions 152 may be oriented such that fluid can be directed onto the vehicle exterior at an angle. According to another aspect, the plurality of nozzle portions 152 may be configured to direct air at a rearward angle, i.e., in a direction toward a rear of a vehicle. However, it will be appreciated that the magnitude and direction of the angle may vary and that the direction of fluid flow through the plurality of nozzle portions 152 may be directed forwardly, i.e. toward the front of the vehicle. Alternatively, the plurality of nozzle portions 152 can direct fluid in a direction generally parallel to the air flow though outlets 112. According to an aspect, as discussed herein, the flow of fluid from the plurality of nozzle portions 152 can match the flow of air from the air outlets 112 of the rinse assembly 102.

According to an aspect, the first fluid portion 140 and the second fluid portion 142 may be fixedly secured to the rinse assembly 102. According to a further aspect, the first fluid portion 140 and the second fluid portion 142 may be secured to the rinse assembly 102 adjacent the air outlets 112. According to an aspect, as the cylinder 132 moves between a retracted and extended position to vary the direction of air flow through the air outlet 112, the direction of the fluid emitted from the first and second manifold 140, 150 similarly varies. It will be appreciated that the location and configuration of the first fluid portion 140 and the second fluid portion 142 may vary as desired.

According to another aspect, individual front and back fluid portions 160, 162 may be disposed on the leg portions 122, 124 of the frame 120. The front and back fluid portions 160, 162 may have the same general configuration as the first fluid portion 140 and the second fluid portion 142. As shown, the front and back fluid portions 160, 162 may be configured to emit separate fluids on to side exterior surfaces of a vehicle without air being emitted thereto in order to dry the side vehicle surfaces. According to another aspect, the front and back fluid portions 160, 162 may be in communication with a controller to move so as to change their direction of fluid flow. According to still another aspect, the front and back fluid portions 160, 162 may remain in a fixed position to emit fluid in a single direction. Alternatively, the may be configured to emit a spray. According to still yet another aspect, the front and back fluid portions 160, 162 may be emit the same or different fluids.

According to an aspect, the controller 115 may be configured to actuate the vehicle wash component 12 as the vehicle approaches the component and then turn it off after the vehicle passes. As is known, in operation, a vehicle may have soap, bubbles and/or foam applied to its exterior during the vehicle wash process. According to an aspect, once the vehicle is cleaned, it can pass to the vehicle wash component 100. The controller can actuate the blower units 104, 106 simultaneously with the first and second fluid portions 140, 142 and the front and back fluid portions 160, 162. The synergistic combination of air and water surprisingly and unexpectedly has worked better than simply using air alone as part of this final drying step.

According to another aspect, application of a drying agent from the second fluid portion 142 after the air and water from the first manifold portion 140 can help to more effectively dry the vehicle exterior surface. In other words, as is known, the drying agent can serve to sheet the water off the vehicle surface. According to a further aspect, the combination of air and water leaves less water on the vehicle surface such that the drying agent can work more effectively, which decreases the amount of water remaining on the surface at the completion of the drying process.

Figure 11A:
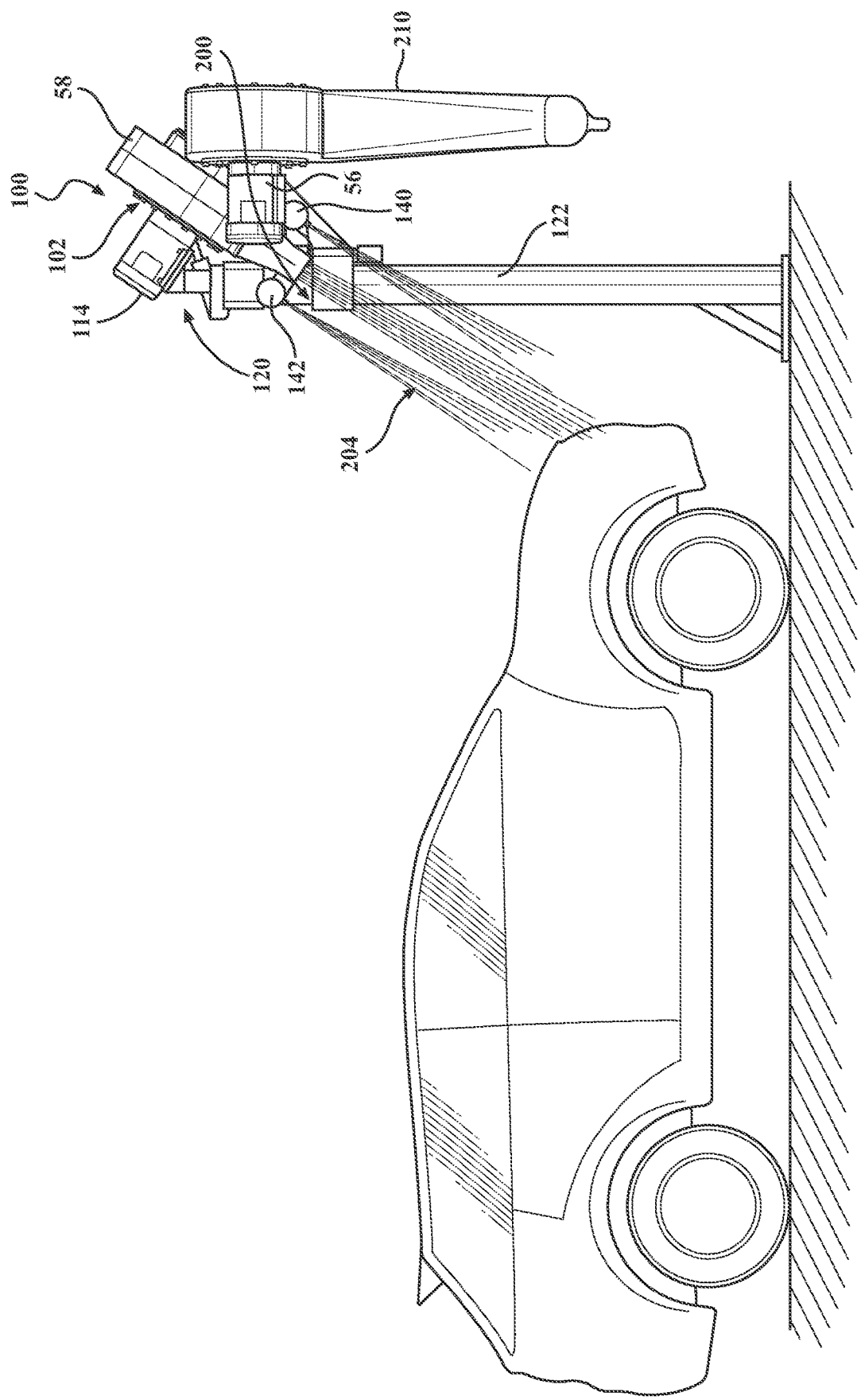
FIG. 11A is a side view of an exemplary vehicle rinse assembly for a vehicle wash system treating a forward portion of a vehicle in accordance with an aspect of the present disclosure.
Figure 11C:
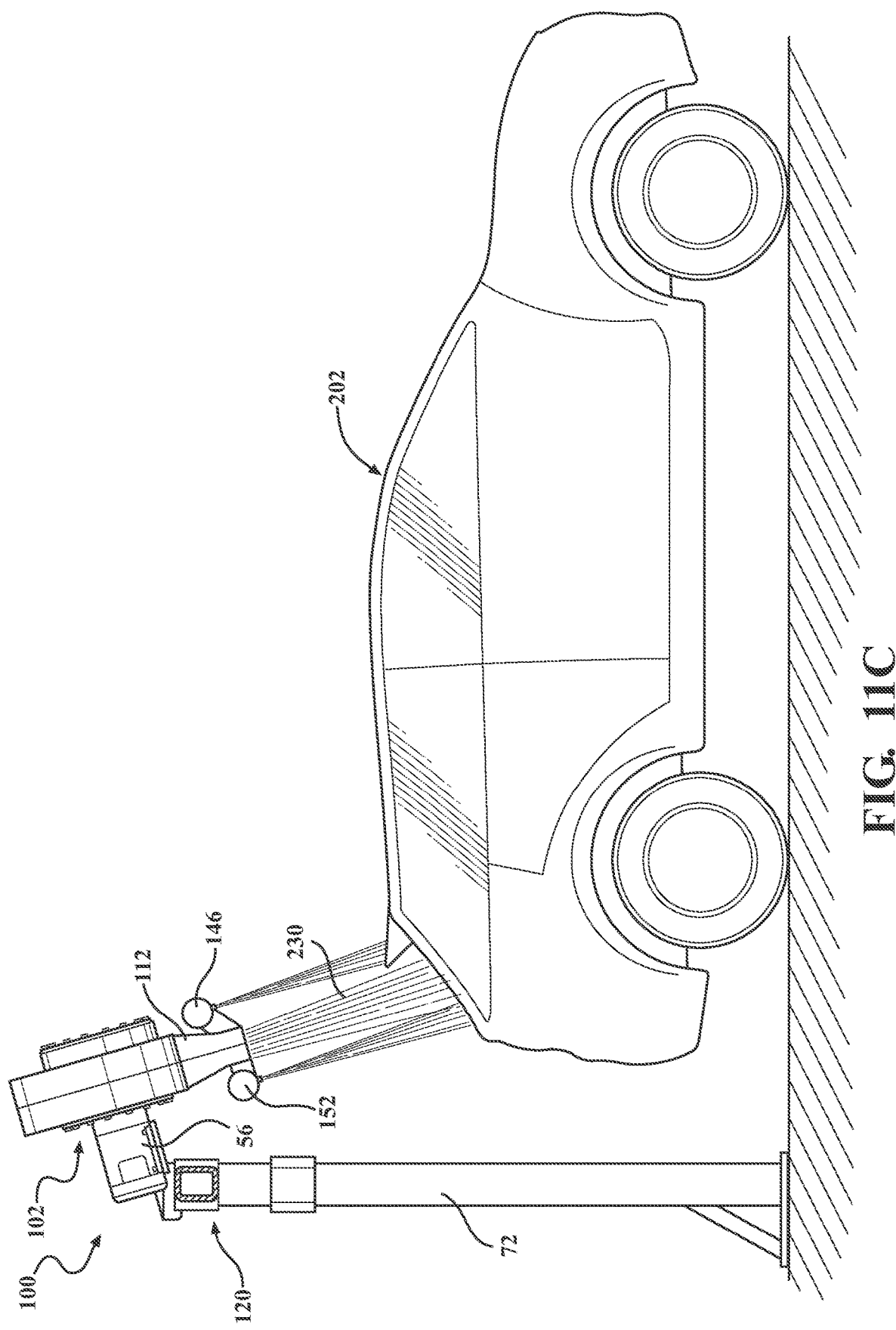
FIG. 11C is side view of the exemplary vehicle rinse assembly of FIG. 11A treating a rearward portion of a vehicle in accordance with an aspect of the present disclosure.

FIGS. 11A-11C schematically illustrate aspects of a vehicle rinse assembly 200 for a vehicle wash system in operation treating portions of a vehicle exterior in accordance with various aspects of the disclosure. Specifically, according to an aspect, FIGS. 11A-11C illustrate how the position of the vehicle rinse assembly 200 can adjust as a vehicle travels under the frame 202 to which the vehicle rinse assembly 200 is mounted in order to provide improved drying capabilities for all vehicle surfaces.

According to an aspect, FIG. 11A exemplarily illustrates the vehicle rinse assembly 102 in a first position with the air outlet 112 directed at a first rearward angle 200 as the vehicle 202 approaches the frame 120. As shown, at the angle 200, air emitted from the air outlet 112 can be emitted rearward, as generally shown by reference number 204. According to another aspect, the first nozzle portions 146 and the second nozzle portions 152 are similarly directed rearward such that fluid from the first and second fluid sources can also be directed onto a front of the vehicle. Thus, in operation, as a vehicle approaches the frame 120, a sensor or other detection mechanism (such as a timing device) can detect the location of the vehicle and communicate that to the controller. Based on the detected vehicle location, when the vehicle 202 reaches a predetermined distance from the rinse assembly 200, the controller 115 can communicate with the vehicle rinse assembly 200 to ensure that the cylinder 132 is in an extended position such that the air outlet 112 is oriented rearward. The controller 115 can also communicate with the rinse assembly 200 at this time to turn on the motor unit 114 such that high velocity air is directed through the air outlet 112 toward the front of the vehicle, as shown in FIG. 11A.

Simultaneously, the controller 115 may communicate with the first and second fluid portions 140, 142 in order to emit water and a drying agent respectively from the first nozzle portions 146 and the second nozzle portions 152. According to another aspect, because the first and second manifold portions 144, 150 are secured to the rinse assembly 102 adjacent the air outlet 112, the first and second nozzle portions 146 and 152 are also directed rearward to emit water and drying agent onto a front surface of the vehicle.

In operation, the combination of water from the first nozzle portions 146 and high velocity air from the air outlet 112 may be applied in combination to the front of the vehicle to help remove excess water from the vehicle exterior. Thereafter, the drying agent can be applied to the vehicle exterior from the second nozzle portions 152 to sheet off any additional remaining water. As discussed above, it will be appreciated that a variety of other suitable fluids may be employed from either or both the first nozzle portions 146 and the second nozzle portions 152. Additionally, as shown, rinse assemblies 210 according to the present disclosure may also be disposed on other portions of the frame 120, such as the leg portions 122, 124.

As schematically shown in FIG. 11B, as the vehicle continues to move under the frame 120, the vehicle rinse assembly 120 may be oriented with the air outlet 112 in the first position, i.e., the cylinder 132 remains in the extended position, such that high velocity air emitted from the air outlet 112 is directed onto the top surface of the vehicle 202 in a generally rearward direction, as indicated by reference number 212. Similarly, according to the aspect where the first and second manifold portions 144, 150 are secured to the rinse assembly 102 adjacent the air outlet 112, the first and second nozzle portions 146 and 152 may also be directed rearward to emit water and drying agent onto the top surface of the vehicle in a generally rearward direction. It will be appreciated that the amount of the rearward angle can be adjusted during the process such that the rinse assembly 102 may be oriented at a different angle for treating the top surface of the vehicle as opposed to the front. It will further be appreciated that the rinse assemblies 210 disposed on the leg portions 122, 124 of the frame 120 may be directed by the controller 115 to emit air and/or fluid onto the vehicle surface at different angles than the rinse assembly 102.

According to an aspect, as schematically shown in FIG. 11C, as the vehicle continues to pass through the frame 120, the controller 115 can communicate with the cylinder 132 such that it moves to the retracted position in order to "flip" the rinse assembly 102 so that the air outlet 112 can emit air in a direction at a second angle. According to an aspect, when the vehicle is detected as being in a predetermined position, the air outlet 112 may be oriented in the second position. According to an aspect, the first and second plurality of nozzle portions 146, 152 may be oriented to direct fluid in the same direction. To orient the rinse assembly 102 in the first position, the controller 115 can move the cylinder 132 to a retracted position such that the air outlet 112 can emit a stream of high velocity air in a forward direction as generally indicted by reference number 230. Orienting the rinse assembly 102 in the second position, can allow air to be more accurately directed at the rear surfaces of a vehicle 202.

As a result, one or more rinse assemblies 102, 200 may be oriented to project air at different locations along the length of the vehicle 202 to adequately dry all vehicle surfaces. It can be readily appreciated by one skilled in the art that the rinse assembly 102 may be fixed in each of the first and second positions or alternatively may oscillate. According to a still further aspect, the controller 115 may be configured to orient the rinse assembly 102 at various different angles such that the air outlet 112 and the fluid nozzle portions 146, 152 may have more than two positions at which to direct air and fluid onto the exterior surface of the vehicle 202.

Figure 12:
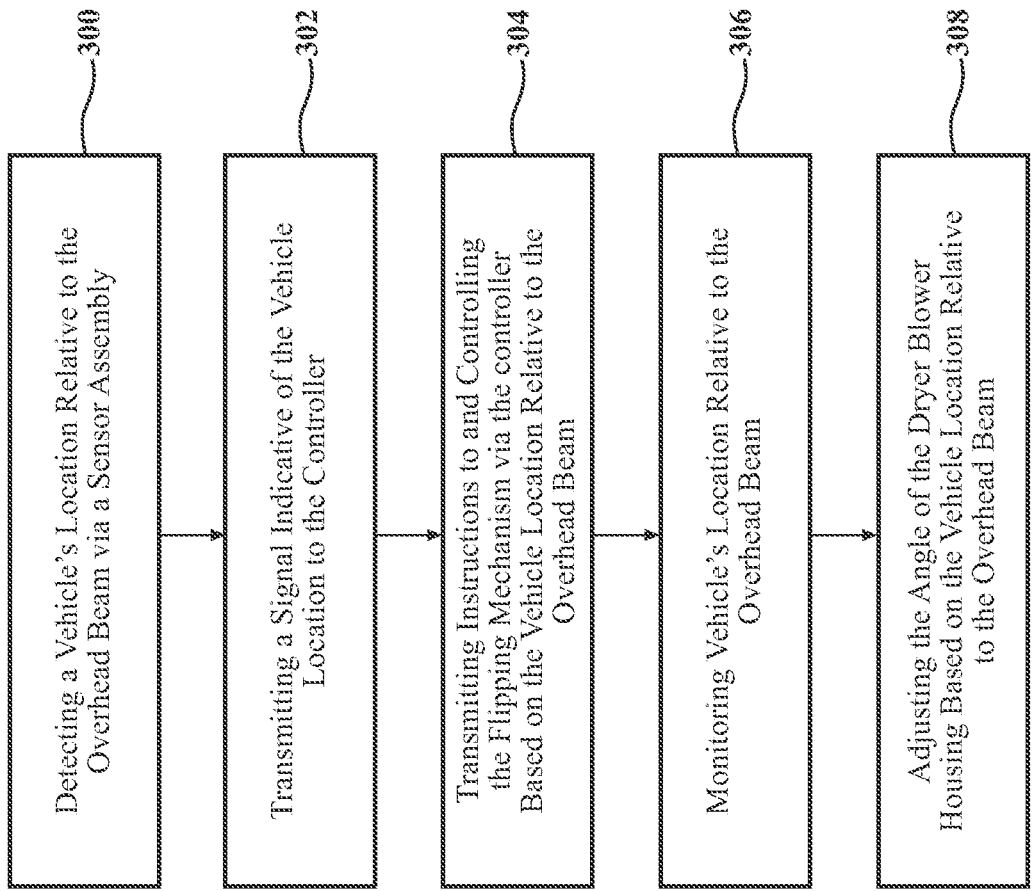
FIG. 12 is a flowchart of a method of rinsing a vehicle traveling through a vehicle wash utilizing an improved vehicle rinse assembly according to an aspect of the present disclosure.

FIG. 12 is a flowchart schematically illustrating a method of drying a vehicle traveling through a vehicle wash utilizing a vehicle rinse assembly 102 in accordance with the present disclosure. According to an aspect, the method may include detecting a vehicle's location proximate or relative to the frame 120 via a detection mechanism, such as a sensor assembly. Once the vehicle's location is detected as generally indicated by reference number 300, then a signal indicative of the vehicle location may be transmitted to the controller 115, as generally indicated by reference number 302. The controller 115 may also transmit instructions and control the flipping or actuator mechanism such as, but not limited to, a pneumatic cylinder such that the rinse assembly 102 may be moved to a desired position with the air outlet and the first and second fluid nozzle portions 146, 152 at the desired angle with respect to the vehicle exterior, as generally indicated by reference number 304. According to an aspect, the location of the vehicle with respect to the frame 120 and the rinse assembly 102 may be monitored as it moves along the conveyor such that the controller 115 may adjust the angle of the rinse assembly in order to direct air and fluid onto all vehicle surfaces, as generally indicated by reference number 308.

It will also be appreciated while the rinse assembly 102 is illustrated as incorporated into a conveyor wash; it can also be incorporated into a roll over wash system where the rinse assembly 102 moves with respect to a stationary vehicle. According to this aspect, the rinse assembly 102 may also be in communication with a controller and a detection assembly that directs when to modify the orientation of the rinse assembly 102 in order to change the direction of flow of air and fluid from the rinse assembly 102. This will allow the rinse assembly 102 to account for vehicles of different sizes to ensure proper drying of all surfaces.

The aspects of the present disclosure provide for an improved vehicle rinse assembly for a vehicle wash system and a method of drying a vehicle utilizing an improved vehicle rinse assembly. According to an aspect, the actuator mechanism can allow the rinse assembly to dynamically position itself such that air is projected to portions of the vehicle exterior that would not otherwise be reached if the blower units remain fixed. In other words, the disclosed vehicle rinse assembly may more effectively dry all surfaces of the vehicle, including compound surfaces unlike the current dryer equipment shown in FIGS. 1-3B. In operation, the sensor assembly may detect the vehicle approaching the frame, the sensor assembly may transmit a signal indicative of the vehicle approaching the frame to the controller, and the controller may instruct the actuator mechanism to actuate or rotate to a desired position or angle. The sensor assembly may continue to detect the vehicle as the vehicle to move under the frame and the controller may direct the cylinder/actuator mechanism accordingly, forcing the blower unit to project air and fluid onto the vehicle at the angles required to adequately dry the vehicle such as the rear surface of the vehicle. In another aspect, the cylinder 132 may have a locking mechanism to lock the rinse assembly into the desired position such that the rinse assembly does not oscillate once the desired position is reached.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle rinsing assembly for treating a vehicle exterior surface, comprising:
   at least one blower unit having:
   a housing;
   an air inlet formed in the housing;
   a motor unit in communication with the housing to draw air into the air inlet; and an air outlet for emitting a stream of high velocity air from the blower unit toward the vehicle exterior surface;

a first fluid outlet disposed adjacent the blower unit and in communication with a first fluid source to direct a spray of a first fluid toward the vehicle exterior surface, the first fluid being a liquid;

wherein the first fluid outlet is configured to direct the spray of the first fluid toward the vehicle exterior surface at a substantially same angle as the stream of high velocity air;

an actuator in communication with the at least one blower unit and configured to vary a direction of the stream of high velocity air from the air outlet with respect to the vehicle exterior surface; and a controller in communication with the motor unit and the first fluid outlet in order to emit air and the first fluid simultaneously toward the vehicle exterior surface;

whereby the controller is further in communication with the actuator to vary the direction of the stream of high velocity air and the spray of the first fluid in response to the location of the vehicle with respect to the rinsing assembly.

2. The assembly of claim 1, wherein the motor unit is an electric motor and includes an impeller disposed adjacent the air inlet to draw air into the housing.

3. The assembly of claim 1, wherein the actuator can be moved between a first position and a second position;

wherein, in the first position, the air outlet is oriented such that the direction of the stream of high velocity air from the blower is directed in a rearward direction; and wherein, in the second position, the air outlet is configured to emit the stream of high velocity air from the blower and the spray of the first fluid in a forward direction.

4. The assembly of claim 3, wherein the controller is configured to communicate with the actuator to move the actuator to the second position in order to direct the stream of high velocity air and the stream of the first fluid toward one or more rear exterior vehicle surfaces.

5. The assembly of claim 3, wherein the actuator is a cylinder having an extended position which corresponds to the first position and a retracted position which corresponds to the second position.

6. The assembly of claim 1, wherein the controller is in communication with a vehicle detection mechanism to detect the location of the vehicle unit with respect to the dryer assembly; and wherein the controller is configured to direct the actuator to move vary the direction of the stream of high velocity air and the spray of the first fluid based on certain predetermined detected vehicle locations with respect to the dryer assembly.

7. The assembly of claim 1, further comprising:
a plurality of first fluid outlets, which are secured to the blower unit adjacent the air outlet, and wherein the first fluid is water.

8. The assembly of claim 7, wherein the plurality of first fluid outlets are secured to the blower unit in an upstream direction with respect to a direction of travel of the vehicle.

9. The assembly of claim 1, further comprising:
a second fluid outlet disposed on the blower unit and in communication with a second fluid source to direct a spray of a second fluid onto the exterior vehicle surface.

10. The assembly of claim 9, further comprising:
a plurality of second fluid outlets, which are secured to the blower unit adjacent the air outlet and wherein the second fluid is a drying agent.

11. The assembly of claim 9, wherein the second fluid outlet is configured to emit a flow of second fluid in generally a same direction as the stream of high velocity air.

12. The assembly of claim 1, wherein the at least one blower housing is secured to a frame such that the actuator can pivot the at least one blower unit to vary the direction of the stream of high velocity air.

13. The assembly of claim 1, wherein the dryer assembly includes a plurality of blower units that are each in communication with the actuator.

14. A vehicle rinsing assembly for a vehicle wash system, comprising:
at least one blower unit having:
a housing with an air inlet and an air outlet;
a motor unit disposed adjacent the air inlet and including an impeller to draw air into the housing and emit a stream of high velocity air from the air outlet;
a first fluid outlet secured adjacent the housing on one side of the air outlet, the first fluid outlet in communication with a first supply of fluid to a emit a first fluid spray comprising a liquid;
a second fluid outlet secured to the housing adjacent an opposing side of the air outlet, the second fluid outlet in communication with a second supply of fluid to emit a second fluid spray;
an actuator in communication with the housing and configured to vary a direction of the air outlet such that the stream of high velocity air may be emitted in different directions;
wherein the actuator has a first position and a second position;
whereby, in the first position, the air outlet, the first fluid outlet, and the second fluid outlet are all configured to emit the stream of high velocity air, the first fluid spray and the second fluid spray respectively in a forward direction; and
whereby, in the second position, the air outlet, the first fluid outlet, and the second fluid outlet are all configured to emit the stream of high velocity air, the first fluid spray and the second fluid spray respectively in a rearward direction.

15. The assembly of claim 14, wherein the housing is formed of a plastic material.

16. The assembly of claim 14, wherein the housing is formed of a translucent material.

17. The assembly of claim 14, further comprising:
a pair of blower units.

18. The assembly of claim 14, wherein the motor unit is an electric motor.

19. The assembly of claim 14, wherein the first fluid spray is a water spray and the first fluid outlet is disposed on an upstream side of the air outlet.

20. The assembly of claim 19, wherein the second fluid spray is a spray of drying agent and the second fluid outlet is disposed on a downstream side of the air outlet.

21. The assembly of claim 14 wherein the actuator is a cylinder having an extended position which corresponds to the first position and a retracted position which corresponds to the second position.

22. The assembly of claim 14, wherein the actuator is in communication with a controller to direct movement thereof to the first position and the second position based on certain predetermined locations of a vehicle with respect to the frame.

23. The assembly of claim 22, further comprising:
a vehicle detection mechanism for determining a location of a vehicle with respect to the dryer assembly and communication the detected location to the controller.

24. The assembly of 14, wherein the at least one blower unit is secured to a frame such that the actuator can pivot the at least one blower unit to vary the direction of the stream of high velocity air.

25. A vehicle rinsing component for a vehicle exterior, comprising:
a frame disposed adjacent a vehicle treatment area;
a dryer assembly pivotally secured to the frame by a bracket, the dryer assembly including a pair of motorized impeller units each having a housing with an air inlet, an air outlet and a motor unit disposed adjacent the air inlet to draw air into the housing and emit a stream of high velocity air from the air outlet;
a plurality of first fluid outlets fixedly secured to the dryer assembly for emitting a first fluid spray comprising a liquid;
an actuator in communication with the dryer assembly to pivot the dryer assembly between a plurality of different positions in order that the stream of high velocity air and the first fluid spray may be emitted in multiple different directions with respect to an exterior of the vehicle;
whereby the rinsing assembly is configured to simultaneously emit the stream of high velocity air and the first fluid spray onto the exterior of the vehicle.

26. The component of claim 25, wherein the frame includes a pair of legs and an overhead portion and wherein the dryer assembly is secured to the overhead portion.

27. The component of claim 25, further comprising:
a controller in communication with the actuator to direct the actuator to pivot the dryer assembly to the plurality of different positions based on a detected location of a vehicle.

28. The component of claim 27, wherein, in one of the plurality of positions, the air outlets are configured to emit the stream of high velocity air in a rearward direction.

29. The component of claim 28, wherein when the air outlets are configured to emit the stream of high velocity air in a rearward direction, the plurality of first fluid outlets are configured to emit the first fluid spray in the rearward direction.

30. The component of claim 28, wherein, in one of the plurality of positions, the air outlets are configured to emit the stream of high velocity air in a forward direction.

31. The component of claim 30, wherein when the air outlets are configured to emit the stream of high velocity air in a forward direction, the plurality of first fluid outlets are configured to emit the first fluid spray in the forward direction.

32. The component of claim 27, further comprising:
a detection mechanism in communication with the controller to communicate the location of the vehicle thereto.

33. The component of claim 25, wherein the motor unit is an electric motor having an impeller disposed adjacent the air inlet to draw air into the housing.

34. The component of claim 25, wherein the actuator is a cylinder having an extended position and a retracted position.

35. The component of claim 25, wherein the plurality of first fluid outlets are secured to the dryer assembly adjacent the air outlets on an upstream side of the housing.

36. The component of claim 25, further comprising:
a plurality of second fluid outlets fixedly secured to the dryer assembly for emitting a second fluid spray.

37. The component of claim 36, wherein the second fluid spray is a drying agent.

38. The component of claim 37, wherein the plurality of second fluid outlets are secured to the dryer assembly adjacent the air outlets on a downstream side of the housing.

* * * * *